(12) United States Patent
Nayak et al.

(10) Patent No.: US 10,495,182 B2
(45) Date of Patent: Dec. 3, 2019

(54) PLANETARY GEAR SYSTEM AND AIR TURBINE STARTER

(71) Applicant: Unison Industries, LLC, Jacksonville, FL (US)

(72) Inventors: Subrata Nayak, Bangalore (IN); Ravindra Shankar Ganiger, Bangalore (IN); David Allan Dranschak, Union, OH (US); Marc David Zinger, Dayton, OH (US); Shiloh Montgomery Emerson Meyers, Dayton, OH (US); Pallavi Tripathi, Bangalore (IN); Sharad Pundlik Patil, Bangalore (IN); Mark Leslie Rickert, Fairborn, OH (US); Harsha Sanjeewa Bulathsinghalage, Miamisburg, OH (US); Matthew Keith Murdock, Dayton, OH (US)

(73) Assignee: Unison Industries, LLC, Jacksonville, FL (US)

( * ) Notice: Subject to any disclaimer, the term of this patent is extended or adjusted under 35 U.S.C. 154(b) by 227 days.

(21) Appl. No.: 15/590,651

(22) Filed: May 9, 2017

(65) Prior Publication Data

US 2018/0347669 A1 Dec. 6, 2018

(51) Int. Cl.
*F16H 1/28* (2006.01)
*F02C 7/277* (2006.01)
(Continued)

(52) U.S. Cl.
CPC ........... *F16H 1/2818* (2013.01); *F02C 7/277* (2013.01); *F02C 7/32* (2013.01); *F16H 1/28* (2013.01);
(Continued)

(58) Field of Classification Search
CPC .................................................... F16H 1/2818
See application file for complete search history.

(56) References Cited

U.S. PATENT DOCUMENTS 3,757,608 A 9/1973 Willner
4,249,431 A 2/1981 Pruvot et al.
(Continued)

FOREIGN PATENT DOCUMENTS

CN 101451593 A 6/2009
DE 102011075916 A1 11/2012
(Continued)

OTHER PUBLICATIONS

Canadian Office Action for counterpart CA 3,003,005, dated Feb. 28, 2019.
(Continued)

*Primary Examiner* — Timothy Hannon
(74) *Attorney, Agent, or Firm* — McGarry Bair PC

(57) ABSTRACT

An apparatus for an air turbine starter for an engine. The air turbine starter includes a housing defining an inlet, an outlet, and a flow path extending between the inlet and the outlet for communicating a flow of gas there through. A turbine member is journaled within the housing and disposed within the flow path for rotatably extracting mechanical power from the flow of gas and having a turbine output shaft. The air turbine starter further includes a planetary gear system drivingly coupled with the turbine output shaft and including a sun gear, a ring gear mounted to the housing, and a set of planetary gears operably coupling the sun gear and the ring gear with the sun gear is coupled to the turbine output shaft.

16 Claims, 8 Drawing Sheets

(51) Int. Cl.
*F16H 57/08* (2006.01)
*F16H 48/06* (2006.01)
*F02C 7/32* (2006.01)

(52) U.S. Cl.
CPC ............. *F16H 48/06* (2013.01); *F16H 57/08* (2013.01); *F05D 2260/40311* (2013.01); *F05D 2260/85* (2013.01)

(56) References Cited

U.S. PATENT DOCUMENTS

| | | |
|---|---|---|
| 4,384,498 A | 5/1983 | Eichinger |
| 4,680,979 A | 7/1987 | Morishita et al. |
| 4,825,723 A | 5/1989 | Martin |
| 5,433,674 A * | 7/1995 | Sheridan ............... F16H 1/2809 475/346 |
| 5,716,300 A | 2/1998 | Sammataro et al. |
| 5,797,185 A | 8/1998 | Sammataro et al. |
| 8,708,863 B2 * | 4/2014 | McCune ................. F01D 5/027 475/159 |
| 2012/0017723 A1 * | 1/2012 | Makulec ................. F02C 7/277 74/7 E |
| 2013/0237369 A1 * | 9/2013 | Sano ..................... B60R 16/027 475/344 |
| 2018/0058545 A1 * | 3/2018 | Ligata ..................... F16H 57/12 |
| 2018/0347669 A1 | 12/2018 | Nayak et al. |

FOREIGN PATENT DOCUMENTS

| | | |
|---|---|---|
| EP | 2998615 A2 | 3/2016 |
| EP | 3401531 A1 | 11/2018 |
| GB | 1557973 A | 12/1979 |
| JP | S55-051149 A | 4/1980 |
| JP | H09-004468 A | 1/1997 |
| JP | 09317833 A | 12/1997 |
| JP | 2000-509471 A | 7/2000 |
| JP | 2018197544 A | 12/2018 |

OTHER PUBLICATIONS

European Search Report for counterpart EP18170278.8, dated Sep. 17, 2018.
Yoshihisa Murayama, Patent Examiner, Japanese Office Action issued in related Japanese Patent Application No. 2018-084625, 3 pages, dated Jul. 23, 2019.

* cited by examiner

PLANETARY GEAR SYSTEM AND AIR TURBINE STARTER

BACKGROUND OF THE INVENTION

A driving mechanism, such as a motor or engine, can generate driving motions at a mechanism output, such as at a rotatable output shaft. The output shaft can, for example, provide a rotational kinetic motion to another piece of equipment via a rotatable drive shaft connected to the output shaft. The piece of equipment receiving the rotational kinetic motion can utilize the driving rotational motion as an energy source to operate. In one example configuration, a gas turbine engine, also known as a combustion turbine engine, is a rotary engine that extracts energy from a flow of combusted gases passing through the engine onto a multitude of turbine blades. The gas turbine engine can provide at least a portion of the rotational kinetic motion to rotating equipment, such as an accessory gearbox, where the rotational motion is utilized to power a number of different accessories. The accessories can include generators, starter/generators, permanent magnet alternators (PMA) or permanent magnet generators (PMG), fuel pumps, and hydraulic pumps.

A planetary gear system can be utilized to drive one or more of the accessories including the starter by fitting a gear train of the starter within a compact profile envelope. Planetary gear systems include one or more planet gears meshed between input and output gears, where the planet gears are designed to rotate about their own axes and to orbit about another axis in the gear train.

BRIEF DESCRIPTION OF THE INVENTION

In one aspect, the present disclosure relates to an air turbine starter for an engine, comprising a housing defining an inlet, an outlet, and a flow path extending between the inlet and the outlet for communicating a flow of gas there through. A turbine member is journaled within the housing and disposed within the flow path for rotatably extracting mechanical power from the flow of gas and having a turbine output shaft. A planetary gear system is drivingly coupled with the turbine output shaft and including a sun gear, a ring gear mounted to the housing, and a set of planetary gears operably coupling the sun gear and the ring gear where the sun gear is coupled to the turbine output shaft, and a drive shaft configured to be operably coupled to and rotate with the engine, wherein the planetary gear system transfers torque from the turbine output shaft to the drive shaft and where the ring gear comprises a flexible ring gear configured to distribute loading among interfaces between the ring gear and the set of planetary gears.

In another aspect the present disclosure relates to a planetary gear system, comprising a sun gear, a set of planetary gears configured to enmesh with the sun gear, and a flexible ring gear including a radially inner portion defining a gear face configured to mesh with the set of planetary gears and a radially outer portion and where the radially inner portion is spaced from the radially outer portion via a set of slots, where the flexible ring gear includes a set of bridges located between the set of slots and coupling the radially inner portion and the radially outer portion, wherein at least one bridge of the set of bridges is configured to deflect under loading from at least one of the set of planetary gears.

In yet another aspect the present disclosure relates to a planetary gear system, comprising a sun gear operably coupled to an input, a set of planetary gears configured to enmesh with the sun gear, a flexible ring gear operably coupled to an output and including a radially inner portion defining a gear face configured to mesh with the set of planetary gears and a radially outer portion and where the radially inner portion comprises a cantilever projected from the radially outward portion and at least a portion of the radially inner portion forming the cantilever is configured to flex and absorb eccentricity from movement of at least one of the planet gears of the set of planetary gears.

DETAILED DESCRIPTION OF THE EMBODIMENTS

Figure 1:
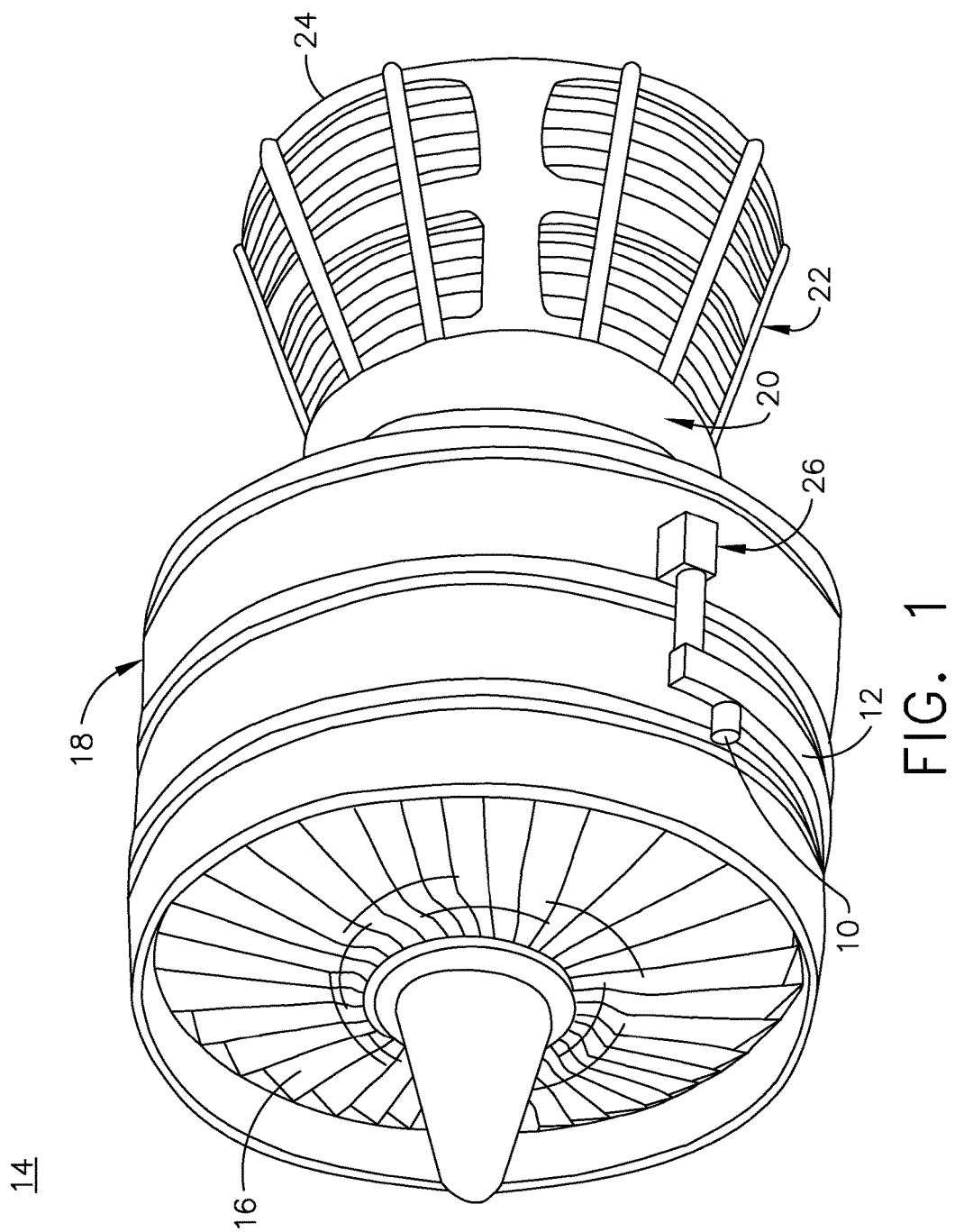
FIG. 1 is a schematic illustration of a turbine engine with an accessory gearbox and a starter in accordance with various aspects described herein.

The present disclosure is related to a driving mechanism generating kinetic motion in the form of a rotating shaft coupled with a piece of rotating equipment, specifically a planetary gear system coupled to the rotating shaft for a starter in a turbine engine. It is desirable to ensure symmetric gear loading at the interfaces between input and output gears of the planetary gear system. While the examples described herein are directed to application of a turbine engine and a starter with a planetary gear system, the disclosure can be applied to any implementation including a planetary gear system.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline. Additionally, as used herein, the terms "radial" or "radially" refer to a dimension extending between a center longitudinal axis of the engine and an outer engine circumference. It should be further understood that "a set" can include any number of the respectively described elements, including only one element.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of a shaft to power the fan 16.

The turbine engine can be a turbofan engine, such as a General Electric GEnx or CF6 series engine, commonly used in modern commercial and military aviation or it could be a variety of other known turbine engines such as a turboprop or turboshaft. The turbine engine can also have an afterburner that burns an additional amount of fuel downstream of the low pressure turbine region 24 to increase the velocity of the exhausted gases, and thereby increasing thrust.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high pressure compression region 18.

Figure 2:
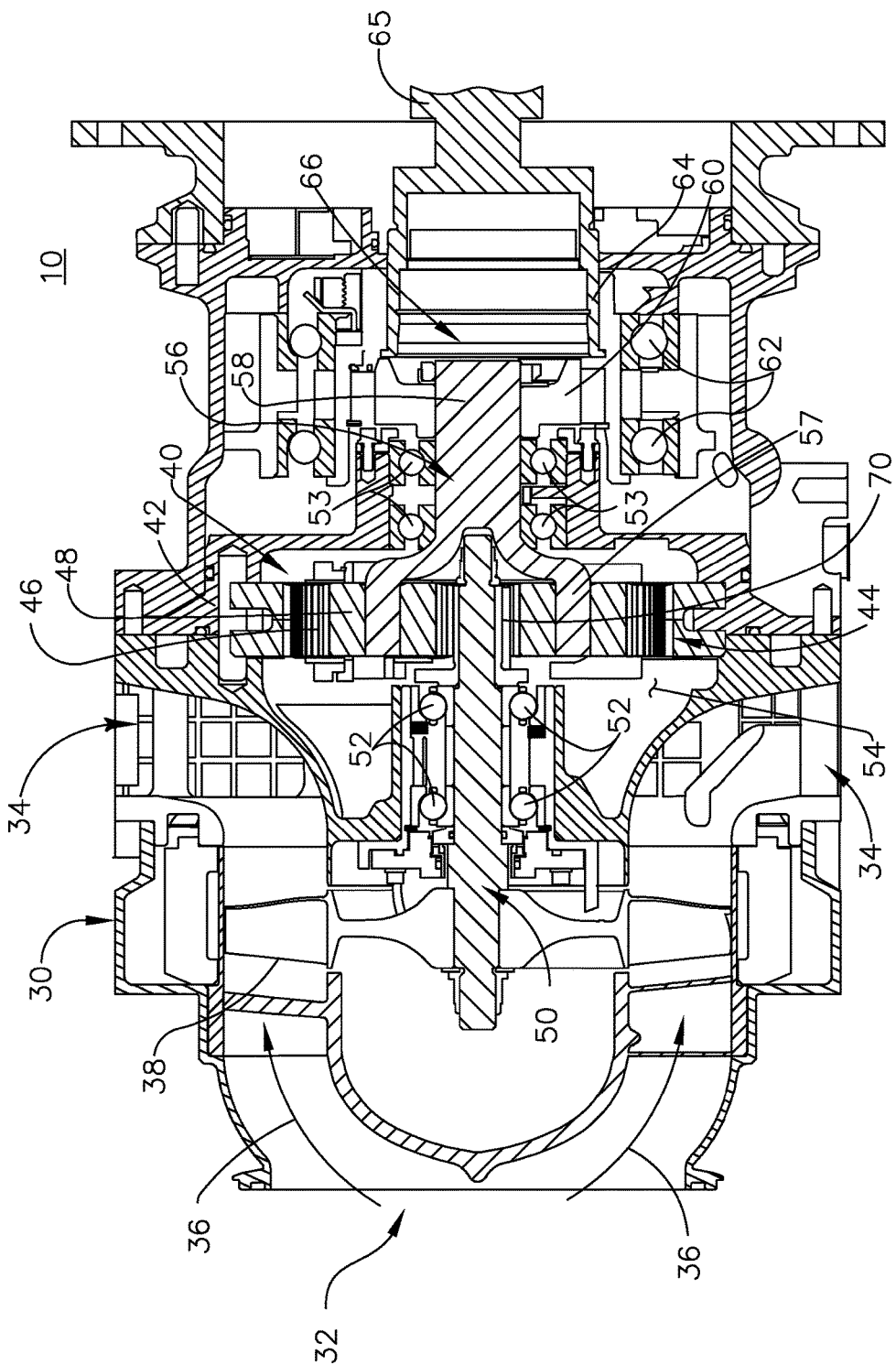
FIG. 2 is an enlarged schematic cross-sectional view of the starter in accordance with various aspects described herein.

Referring now to FIG. 2, the air turbine starter 10, which can be mounted to the AGB 12 is shown in greater detail. Generally, the air turbine starter 10 includes a housing 30 defining an inlet 32, an outlet 34, and a flow path 36 extending between the inlet 32 and outlet 34 for communicating a flow of gas therethrough. In one non-limiting example the gas is air and is supplied from either a ground-operating air cart, an auxiliary power unit, or a cross-bleed start from an engine already operating. The air turbine starter 10 includes a turbine member 38 journaled within the housing 30 and disposed within the flow path 36 for rotatably extracting mechanical power from the flow of gas along the flow path 36. A gear box 42 is mounted within the housing 30. Further, a gear train 40, disposed within the gear box 42 and drivingly coupled with the turbine member 38, can be caused to rotate.

The gear train 40 includes a planetary gear system 44 having a ring gear 46 and a set of planetary gears 48 rotatable about a sun gear 70. A turbine shaft 50 couples to the sun gear 70 of the gear train 40 to the turbine member 38 allowing for the transfer of mechanical power to the gear train 40. The turbine shaft 50 is coupled to the gear train 40 and rotatably supported by a pair of turbine bearings 52. The gear train 40 is supported by a pair of carrier bearings 53. The gear box interior 54 can contain a lubricant, including, but not limited to, a grease or oil to provide lubrication and cooling to mechanical parts contained therein such as the gear train 40, ring gear 46, and bearings 52, 53.

There is an aperture 56 in the gear box 42 through which the turbine shaft 50 connects to the sun gear 70, which in turn rotates the planet gears 48, which push against the ring gear 46 to rotate a planetary arm 57. The planetary arm 57 couples the planetary gear system 44 to a drive shaft 64 via a carrier shaft 58. The carrier shaft 58 passes through a clutch 60 that is mounted and supported by a pair of spaced bearings 62. The drive shaft 64 extends from the gear box 42 and is coupled to the clutch 60 and additionally supported by the pair of spaced bearings 62. The drive shaft 64 is driven by the gear train 40 and coupled to the AGB 12 by way of non-limiting example via an output shaft 65, such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or combinations thereof. An example of a shaft interface portion is disclosed in U.S. Pat. No. 4,281,942 to General Electric and is incorporated herein by reference in its entirety.

The starter 10 can be formed by any known materials and methods, including, but not limited to, die-casting of high strength and lightweight metals such as aluminum, stainless steel, iron, or titanium. The housing 30 and the gear box 42 can be formed with a thickness sufficient to provide adequate mechanical rigidity without adding unnecessary weight to the air turbine starter 10 and, therefore, the aircraft.

The rotatable shaft 66 can be constructed by any known materials and methods, including, but not limited to extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. The diameter can vary to accommodate different sizes, as well as rotor to stator spacings.

As described herein, air supplied along the flow path 36 rotates the turbine member 38 for driving the rotation of the rotating shafts 50, 58, 64. Therefore during starting operations, the starter 10 can be the driving mechanism for the turbine engine 14 via rotation of the rotating shafts 50, 58, 64. After this point, the engine 10 instead drives the starter 10, only driving the drive shaft 64 as the clutch 60 can prevent the spinning of the rest of the rotating shafts 50, 58, 64.

Many other possible examples and configurations in addition to those shown in the above figures are contemplated by the present disclosure. Additionally, the design and placement of the various components such as the AGB 12, power-take off 26, or the starter 10 or components thereof can be rearranged such that a number of different in-line configurations could be realized.

Figure 3:
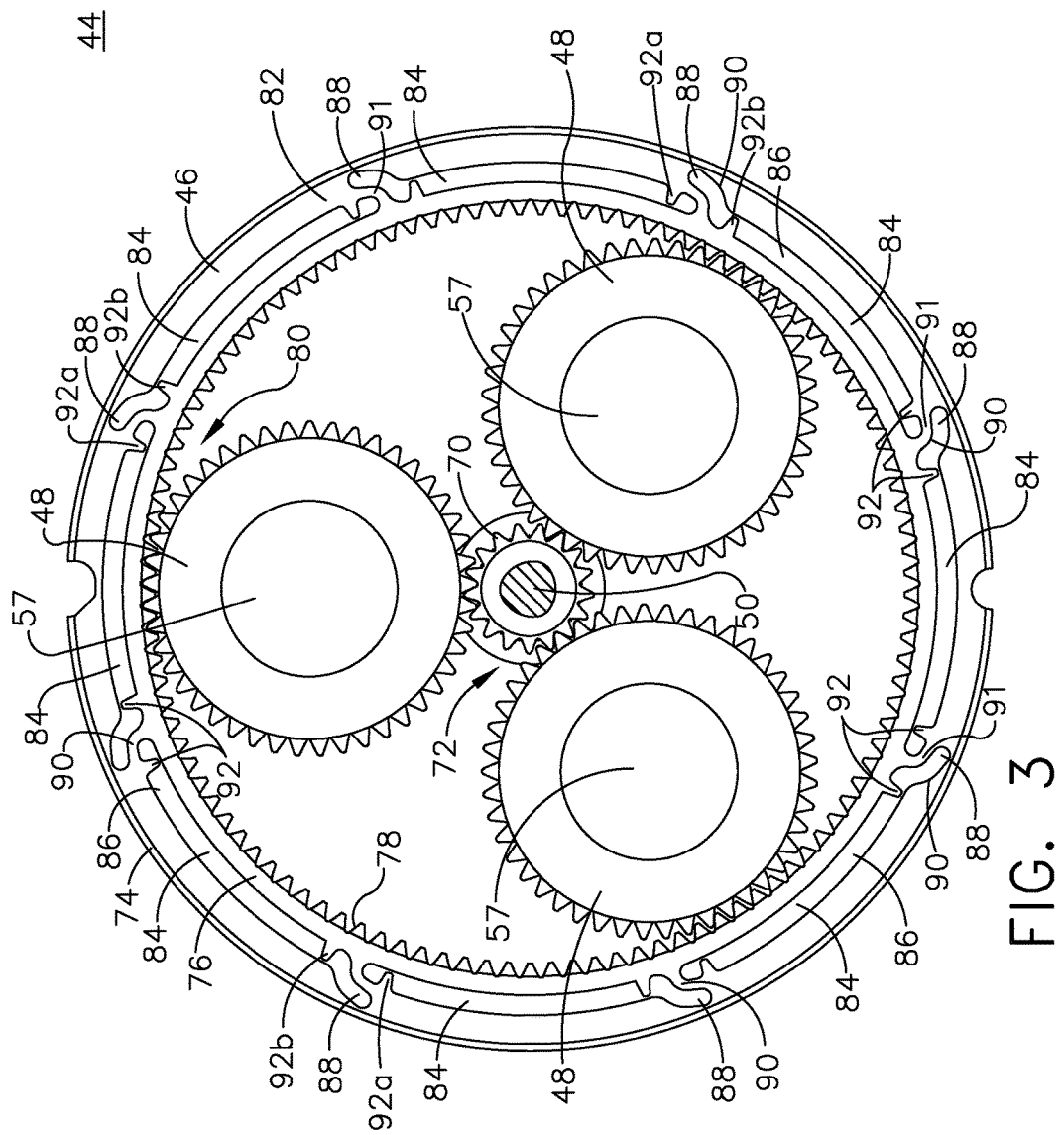
FIG. 3 is a cross-sectional view of a planetary gear system for the starter of FIG. 2 in a first aspect described herein.

Turning to FIG. 3, the planetary gear system 44 is illustrated in more detail and it can more clearly be seen that the sun gear 70 is coupled to the turbine shaft 50. The set of planetary gears 48 is illustrated as, but is not limited to, three planetary gears that surround the sun gear 70. An inner interface 72 is created where the sun gear 70 meets the set of planetary gears 48. It is contemplated that the sun gear 70, the set of planetary gears 48, or both the sun gear 70 and set of planetary gears 48 are, by way of non-limiting example, pinion gears. Pinion gears are round gears and usually refer to the smallest of the gears in the planetary gear system 44 or can also be the driving gear in the planetary gear system 44. By way of non-limiting example, the sun gear 70 is illustrated as the pinion gear.

The ring gear 46 circumscribes the planetary gears 48. The ring gear 46 includes a radially inner portion 76 defining a gear face 78. An outer interface 80 is created where the set of planetary gears 48 meshes with the gear face 78 of the ring gear 46. The ring gear 46 is mounted within the gear box 42 at a radially outer portion 74 such that the ring gear 46 is a stationary component of the starter 10.

According to aspects of the disclosure the ring gear 46 can be considered a flexible ring gear 82. More specifically, a set of slots 84 is provided in between the radially outer and inner portions 74, 76 of the ring gear 46. The set of slots 84 can each include a substantially circumferential portion 86 terminating in a tip portion 88 provided in the radially outer portion 74 of the ring gear 46. While illustrated as having eight slots, the set of slots 84 can include any number of slots including a single slot; the set of slots 84 shown in FIG. 3 is for illustrative purposes and not meant to be limiting.

A bridge 90, is located between two of the set of slots 84 and extends from the radially inner portion 76 to the radially outer portion 74 of the ring gear 46. The bridge 90 does not need to be a linear bridge. For example, a bend 91 can be included in the bridge 90. The bend 91 defines where the bridge 90 turns from being oriented in a substantially circumferential direction along the radially outer portion 74 to being oriented in a substantially radial direction where the bridge 90 connects to the radially inner portion 76. The bridge 90 can be included in a set of bridges depending on the number of slots 84. While illustrated as having eight bridges, the set of bridges 90 can include more or less bridges. The set of bridges 90 shown in FIG. 3 is for illustrative purposes and not meant to be limiting.

A set of bumpers 92 extends from each of the radially outer and inner portions 74, 76 of the flexible ring gear 82. The set of bumpers extends into the set of slots 84. A first bumper 92a extends from the radially outer portion 74 of the flexible ring gear 82 in a first slot 84 where the bridge 90 meets the radially outer portion 74 of the flexible ring gear 82. A second bumper 92b extends from the radially inner portion 76 of the flexible ring gear 82 in a second slot 84 where the bridge 90 meets the radially inner portion 76 of the flexible ring gear 82. It is contemplated that only one bumper of the set of bumpers 92 can be included and can extend from either one of the outer or inner portions 74, 76. It is further contemplated that the set of bumpers 92 is a plurality of bumpers 92 extending from one of or both of the radially outer and inner portions 74, 76 of the flexible ring gear 82. The set of bumpers 92 shown in FIG. 3 is for illustrative purposes and not meant to be limiting.

The planetary gears 48, sun gear 70, and ring gear 46 can be constructed by any material and method, including, but not limited to extrusion or machining of high strength metal alloys such as those containing aluminum, iron, nickel, chromium, titanium, tungsten, vanadium, or molybdenum.

Figure 4:
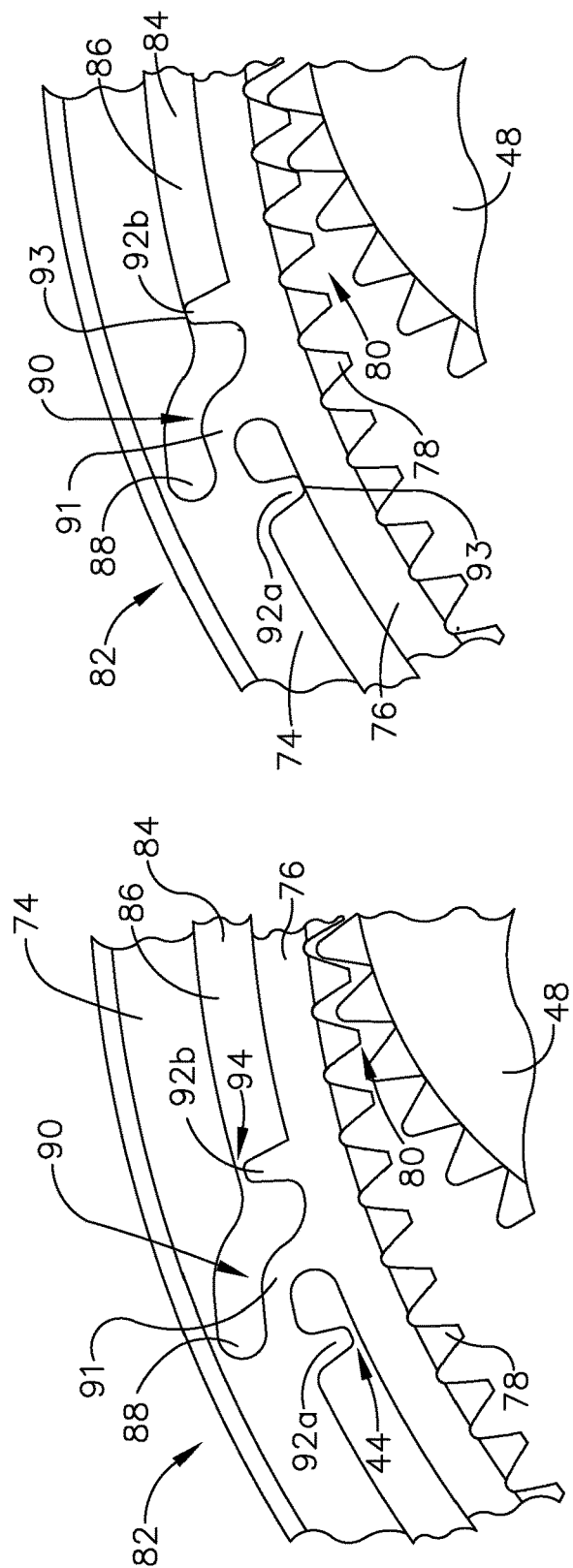
FIG. 4A is an enlarged cross-sectional view of the planetary gear system from FIG. 3 in a normal operating circumstance.
FIG. 4B is an enlarged cross-sectional view of the planetary gear system from FIG. 3 in an overloaded operating circumstance.

FIG. 4A is an enlarged view of a portion of the planetary gear system 44 including a bridge 90 and bumpers 92a, 92b. A gap 94 is formed between each of the bumpers 92a, 92b and the radially outer and inner portions 74, 76 of the flexible ring gear 82. The flexible ring gear 82 is configured to distribute loading across the outer interface 80 between the flexible ring gear 82 and the set of planetary gears 48. Under normal operating conditions, the set of bridges, including the illustrated bridge 90, are configured to deflect as needed. The set of bridges 90 allow distortions in the concentricity of the planetary gears 48 to be absorbed such that the load is evenly distributed at the outer interface 80. The gap 94 remains open while the set of bridges 90 deflects providing flexibility and an even distribution of load at all outer interfaces 80. The radially inner portion 76 is configured to flex and absorb eccentricity from movement of at least one of the planet gears 48 of the planetary gear system 44.

Turning to FIG. 4B, in an abnormal or overloaded operating condition, at least one of the set of bridges 90 deflects to a point where an end 93 of at least one of the bumpers 92a, 92b come in contact with the radially outer or inner portions 74, 76 of the flexible ring gear 82. In the illustrated example upon deflection of the bridge 90, both bumpers 92a, 92b move to close the gaps 94 such that at least a portion of the set of slots 84 becomes closed separating the circumferential portion 86 from the tip portion 88. The bumpers 92a, 92b limit and control the extent to which the bridge 90 can deflect. The bumpers 92a, 92b and the corresponding gaps 94 are sized according to normal operating limits. Normal operating conditions include the torques and speeds experienced during starting of the engine 10. The air turbine starter 10 specifications disclose maximum speeds and maximum torques, or the stall torque. The planetary gear system 44 can have a gearbox ratio and inlet conditions specific to the air turbine starter 10 to which it is being installed. The bumpers 92a, 92b serve to prevent failure of the bridge 90 and to transfer load from the planetary gears 48 through the flexible ring gear 82 to the gear box 42 to prevent damage to the flexible ring gear 82. In an overloaded operating condition, the flexible ring gear 82 performs like a conventional solid ring gear such that loads continue to be transferred without the flexible aspect of the ring gear 46.

FIGS. 5-8 illustrate flexible ring gears 182, 282 according to other aspects of the present disclosure described herein. The flexible ring gears 182, 282 are similar to the flexible ring gear 82, therefore, like parts will be identified with like numerals increased by 100 and 200 respectfully. It should be understood that the description of the like parts of the flexible ring gear 82 applies to the flexible ring gears 182, 282 unless otherwise noted.

Figure 5:
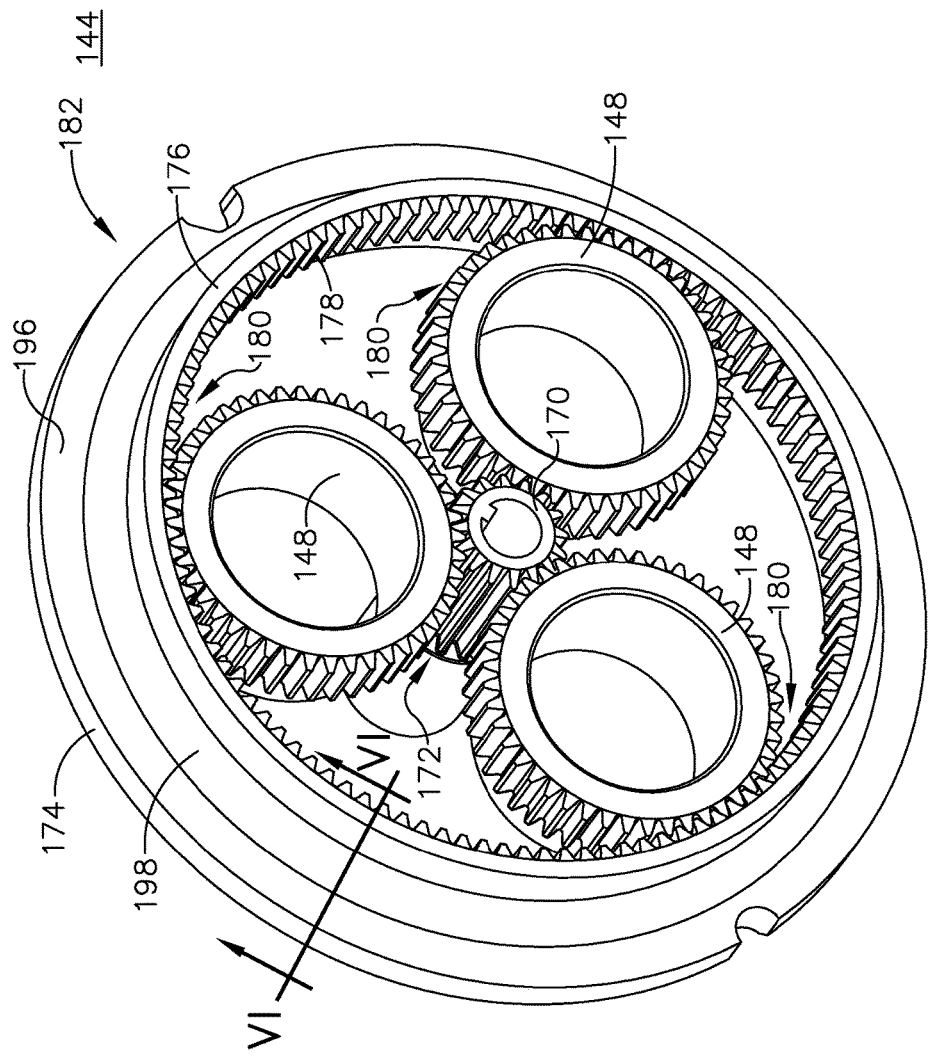
FIG. 5 is a perspective view of a planetary gear system for the starter of FIG. 2 in a second aspect described herein.

As illustrated in FIG. 5, the flexible ring gear 182 has a body 196 defining a radially outer portion 174 where the flexible ring gear 182 is mounted to the gear box 42. A cantilever 198 projects axially from the body 196 to define at least a portion of a radially inner portion 176. A set of planetary gears 148 is operably coupled to the flexible ring gear 182 at an outer interface 180. A gear face 178 configured to mesh with the set of planetary gears 148 extends axially along the radially inner portion 176 of the flexible ring gear 182.

Figure 6A:
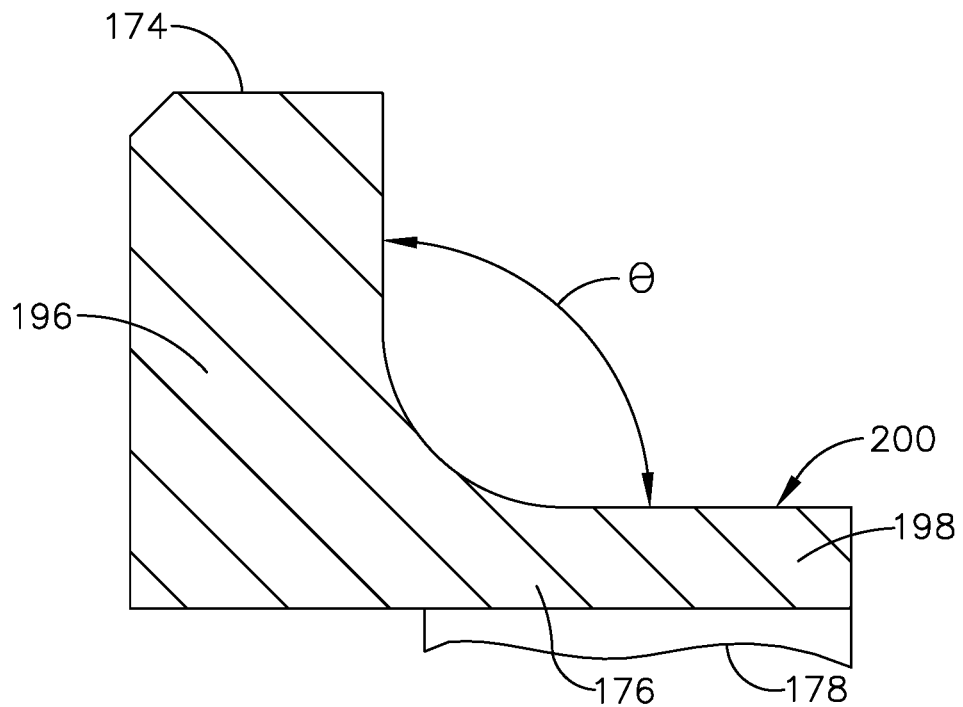
FIG. 6A is an enlarged cross-sectional view of the planetary gear system from FIG. 5 in an unloaded operating circumstance.

As illustrated in FIG. 6A, the cantilever 198 extends from the body 196 such that the cantilever 198 and the body 196 form an angle θ of 90 degrees in a starting position 200.

Figure 6B:
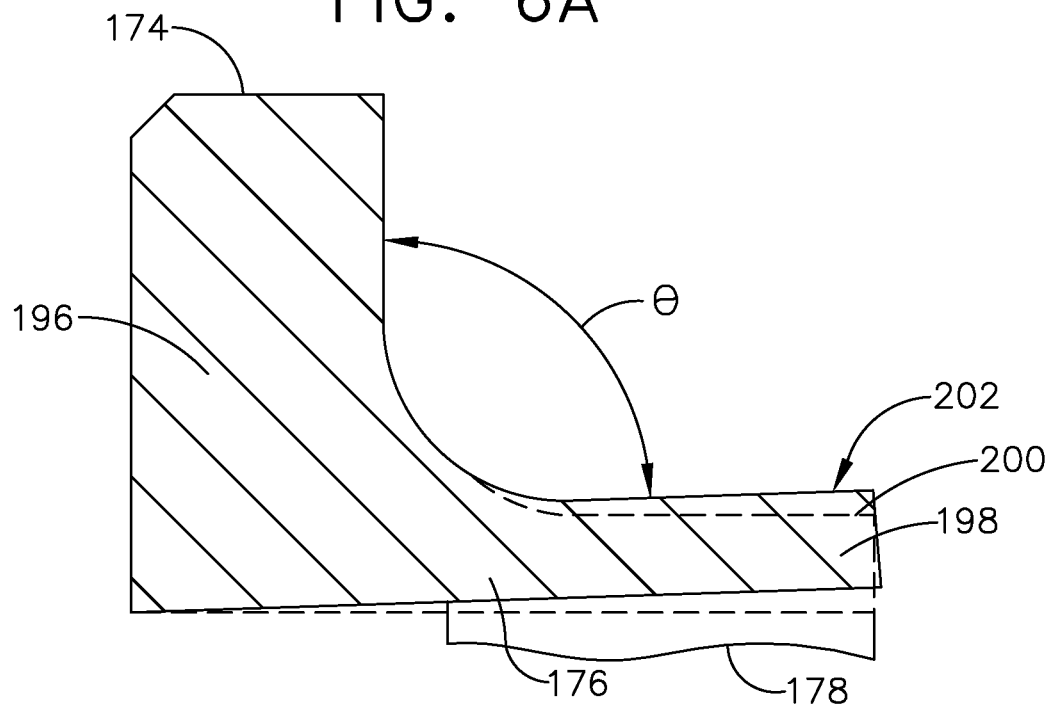
FIG. 6B is an enlarged cross-sectional view of the planetary gear system from FIG. 5 in a loaded operating circumstance.

Turning to FIG. 6B, the cantilever 198 provides flexibility such that the angle θ can change to a secondary position 202. A planetary gear 148 (FIG. 5) can push the cantilever 198 such that the angle θ decreases to the secondary position 202. The angle θ can range from 80 to 90 degrees in a non-limiting example. It is understood that the angle can be more or less than 80 to 90 degrees, enough to absorb a non-uniform load by allowing for angular strain. The cantilever 198 allows distortions in the concentricity of the planetary gears 148 to be absorbed such that the load is evenly distributed at the outer interface 180. It should be understood that the secondary position 202 is a non-limiting example and can be located at a range of positions.

Figure 7:
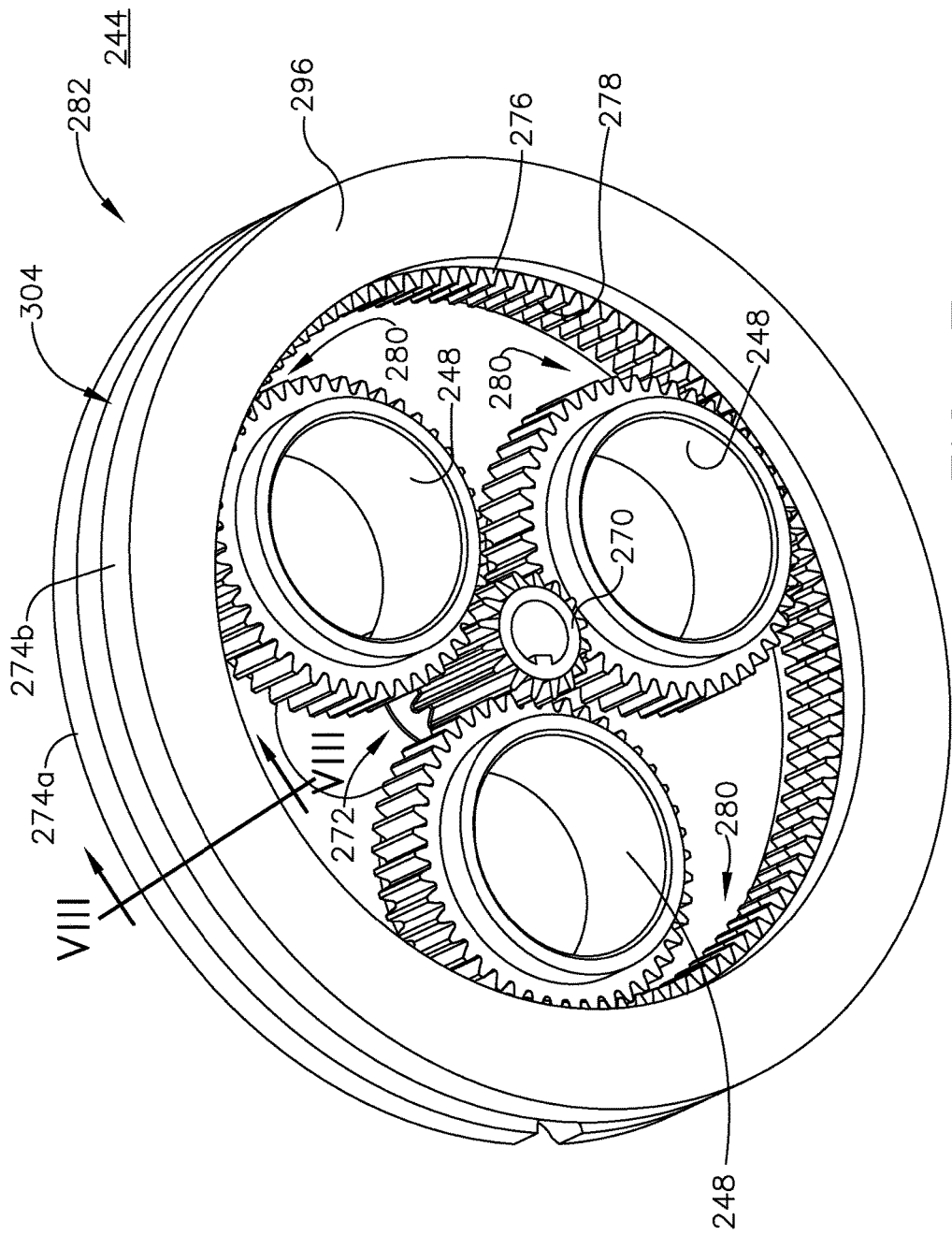
FIG. 7 is a perspective view of a planetary gear system for the starter of FIG. 2 in a third aspect described herein.

In FIG. 7 a third exemplary flexible ring gear 282 includes a body 296 from which a set of radially outer portions 274a, 274b extend. The flexible ring gear 282 is mounted to the gear box 42 at both radially outer portions 274a, 274b. A set of cantilevers 298 (FIG. 8) extends axially between the set of radially outer portions 274a, 274b to define a cavity 304. The set of cantilevers 298 define at least a portion of a radially inner portion 276. A set of planetary gears 248 is operably coupled to the flexible ring gear 282 at an outer interface 280. A gear face 278 configured to mesh with the set of planetary gears 248 extends axially along the radially inner portion 276 of the flexible ring gear 282.

Figure 8:
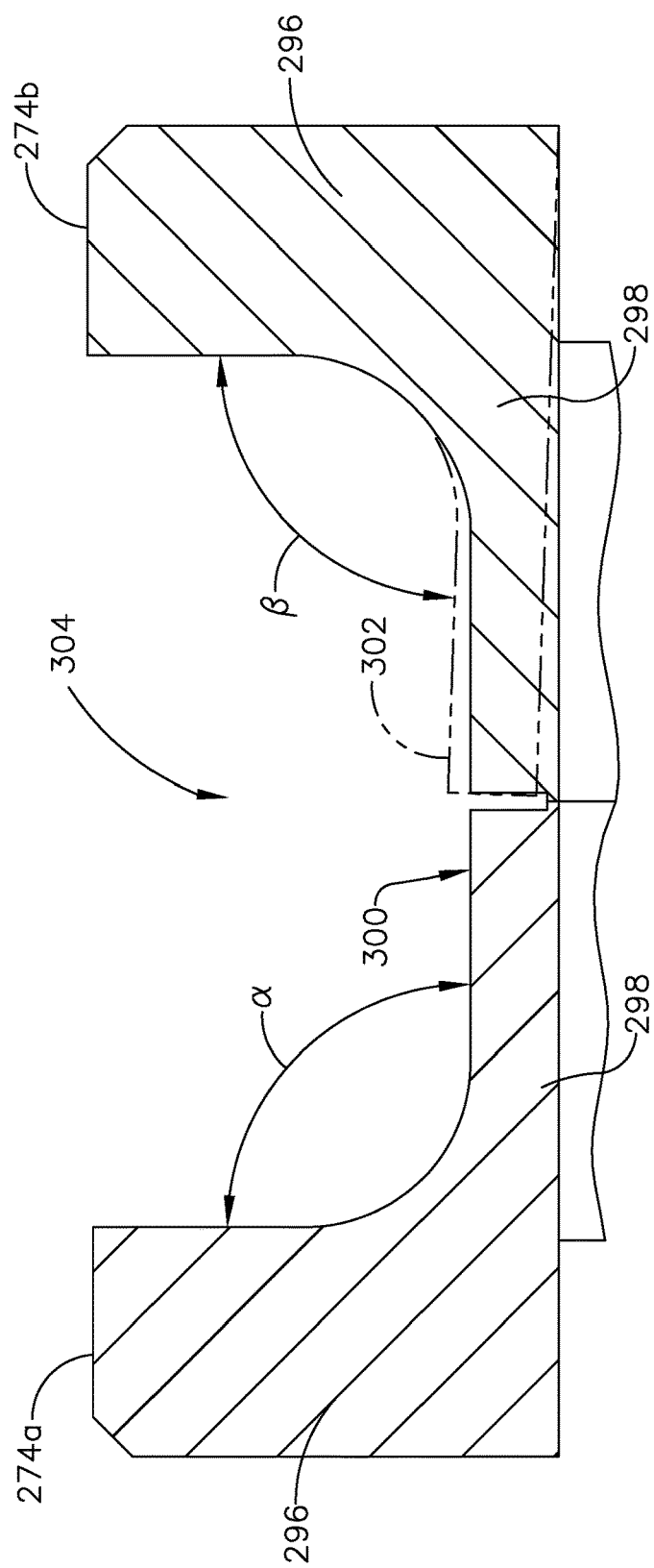
FIG. 8 is an enlarged cross-sectional view of the planetary gear system from FIG. 7 in an unloaded operating circumstance with a loaded operating circumstance shown in phantom.

As illustrated in FIG. 8, the set of cantilevers 298 extends between the radially outer portions 274a, 274b each forming angles α, β of 90 degrees with the body 296 in a starting position 300. The set of cantilevers 298 provide flexibility such that the angles α, β can change to a secondary position 302. In the illustrated example, a planetary gear 148 (FIG. 5) can push the cantilever 198 such that the angles β decreases to the secondary position 302. The angles α, β can range from 80 to 90 degrees in a non-limiting example. It is understood that the angle can be more or less than 80 to 90 degrees, enough to absorb a non-uniform load by allowing for angular strain. The set of cantilevers 298 allow for distortions in the concentricity of the planetary gears 248 to be absorbed such that the load is evenly distributed at the outer interface 280. It should be understood that the secondary position 302 illustrated is a non-limiting example and can occur in one or both of the cantilevers 298. Furthermore, the secondary position 302 can be at a range of locations and is not limited to the secondary position 302 illustrated. With a set of cantilevers 298, the flexible ring gear 282 provides axial variability in load distribution for the set of planetary gears 248.

In a finite element analysis, the flexible ring gear was rated to flex 40 to 50 times more in a radial direction than a solid ring gear. In experiments measuring temperatures of a solid ring gear compared to a flexible ring gear, running temperatures for the flexible ring gear remained 10-15 degrees ° F. below that of a solid ring gear. This increase in flexibility and decrease in operating temperature can translate into a longer operating life and a more efficient operating starter.

Flexibility in the gear meshes reduces peak loads on gear teeth resulting from uneven load distribution in turn increasing the life of the gear system. Particularly reduction in uneven loading increases lifespan of the bearing systems and the supporting gearbox components including the planet gear bearings and carrier bearings. With a reduction in wear of gearbox components the buildup of metal shavings in oil of the starter which can affect other starter components is also reduced. Additionally, the planetary gear system as described herein has a capability of reducing margins in gearbox as loading behavior on sensitive components is more predictable which can result in weight and cost savings.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Moreover, while "a set of" various elements have been described, it will be understood that "a set" can include any number of the respective elements, including only one element. Combinations or permutations of features described herein are covered by this disclosure.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air turbine starter for an engine, comprising:
 a housing defining an inlet, an outlet, and a flow path extending between the inlet and the outlet for communicating a flow of gas there through;
 a turbine member journaled within the housing and disposed within the flow path for rotatably extracting mechanical power from the flow of gas and having an output;
 a planetary gear system drivingly coupled with the output, the planetary gear system comprising:
  a sun gear,
  the ring gear comprising a flexible ring gear with a radially inner portion defining a gear face and a radially outer portion mounted to the housing and having a set of slots located therebetween, the flexible ring gear including a set of bridges located between the set of slots and coupling the radially inner portion and the radially outer portion, and at least one bumper separate from the set of bridges extending from one of the radially inner portion or the radially outer portion into a slot of the set of slots where the bumper engages the other of the of the radially inner portion or the radially outer portion during abnormal loading, and a set of planetary gears configured to mesh with the gear face and operably coupling the sun gear and the ring gear where the sun gear is coupled to an input; and a drive shaft configured to be operably coupled to and rotate with the engine;

wherein the planetary gear system transfers torque from the output to the drive shaft and where the flexible ring gear is configured to distribute loading among interfaces between the ring gear and the set of planetary gears.

2. The air turbine starter of claim 1 wherein at least one bridge of the set of bridges is configured to deflect under loading.

3. The air turbine starter of claim 2 wherein the at least one bridge is configured to deflect without closing a slot of the set of slots during normal loading of the planetary gear system.

4. The air turbine starter of claim 3 wherein the at least one bridge is configured to deflect to close at least a portion of the slot during abnormal loading of the planetary gear system.

5. The air turbine starter of claim 4, wherein when the bumper engages the other of the of the radially inner portion or the radially outer portion the at least a portion of the slot becomes closed.

6. The air turbine starter of claim 1 wherein the at least one bumper is adjacent the at least one bridge.

7. The air turbine starter of claim 6 wherein the at least one bumper comprises at least two bumpers adjacent the at least one bridge.

8. The air turbine starter of claim 7 wherein a first bumper on a first side of the at least one bridge extends from the radially inner portion and a second bumper on a second side of the at least one bridge extends from the radially outer portion.

9. The air turbine starter of claim 1, wherein the output is a carrier shaft and the input is a turbine shaft.

10. A planetary gear system, comprising:
a sun gear;
a set of planetary gears configured to mesh with the sun gear;
a flexible ring gear including a radially inner portion defining a gear face configured to mesh with the set of planetary gears and a radially outer portion and where the radially inner portion is spaced from the radially outer portion via a set of slots, where the flexible ring gear includes a set of bridges located between the set of slots and coupling the radially inner portion and the radially outer portion; and at least one bumper extending from one of the radially inner portion or the radially outer portion into a slot of the set of slots proximate and separate from the set of bridges at a location where the bridge meets the radially inner portion or the radially outer portion where the bumper engages the other of the of the radially inner portion or the radially outer portion during abnormal loading;

wherein at least one bridge of the set of bridges is configured to deflect under loading from at least one of the set of planetary gears.

11. The planetary gear system of claim 10 wherein the at least one bridge is configured to deflect without closing a slot of the set of slots during normal loading of the planetary gear system.

12. The planetary gear system claim 10 wherein the at least one bridge is configured to deflect to close at least a portion of the slot during abnormal loading of the planetary gear system.

13. The planetary gear system of claim 12, wherein when the bumper engages the other of the of the radially inner portion or the radially outer portion the at least a portion of the slot becomes closed.

14. The planetary gear system of claim 13, wherein the at least one bumper is adjacent the at least one bridge.

15. The planetary gear system of claim 14, wherein the at least one bumper comprises a first bumper on a first side of the at least bridge extends from the radially inner portion and a second bumper on a second side of the at least bridge extends from the radially outer portion.

16. A planetary gear system, comprising:
a sun gear operably coupled to an input;
a set of planetary gears configured to mesh with the sun gear;
a flexible ring gear operably coupled to an output and including a radially inner portion defining a gear face configured to mesh with the set of planetary gears and a body defining a radially outer portion mounted to a gear box where a cantilever axially projects from the body and at least partially defines the radially inner portion;
wherein the cantilever is configured to flex and deflect under loading and absorb eccentricity from movement of at least one of the planet gears of the set of planetary gears.

* * * * *